United States Patent
Anandan et al.

(10) Patent No.: US 12,418,537 B2
(45) Date of Patent: Sep. 16, 2025

(54) INDUSTRIAL DEVICE MAC AUTHENTICATION BYPASS BOOTSTRAPPING

(71) Applicant: Cisco Technology, Inc., San Jose, CA (US)

(72) Inventors: Swapna Anandan, Fremont, CA (US); Flemming Stig Andreasen, Marlboro, NJ (US); Robert E. Barton, Richmond (CA)

(73) Assignee: Cisco Technology, Inc., San Jose, CA (US)

(*) Notice: Subject to any disclaimer, the term of this patent is extended or adjusted under 35 U.S.C. 154(b) by 223 days.

(21) Appl. No.: 17/750,198

(22) Filed: May 20, 2022

(65) Prior Publication Data

US 2023/0412603 A1    Dec. 21, 2023

(51) Int. Cl.
*H04L 29/06* (2006.01)
*H04L 9/40* (2022.01)

(52) U.S. Cl.
CPC ........ *H04L 63/102* (2013.01); *H04L 63/0876* (2013.01); *H04L 63/101* (2013.01); *H04L 63/20* (2013.01)

(58) Field of Classification Search
None
See application file for complete search history.

(56) References Cited

U.S. PATENT DOCUMENTS

| | | |
|---|---|---|
| 9,325,516 B2 | 4/2016 | Pera et al. |
| 2020/0287924 A1* | 9/2020 | Zhang ............... G06F 16/288 |
| 2021/0344738 A1 | 11/2021 | Petrie et al. |
| 2022/0030334 A1 | 1/2022 | Stamatakis et al. |

FOREIGN PATENT DOCUMENTS

| | | | |
|---|---|---|---|
| KR | 20100090489 | 8/2010 | |
| WO | WO-2018142697 A1 * | 8/2018 | ............... B60L 3/00 |
| WO | 2022045851 | 3/2022 | |

OTHER PUBLICATIONS

Li, et al., "Behaviour Profiling for Transparent Authentication for Mobile Devices", Edith Cowan University, Research Online, ECU Publications, 2011, pp. 307-314.
"Configure device profiling authentication", online: https://backstage.forgerock.com/docs/idcloud/latest/solution-configure-device-profiling.html, accessed May 18, 2022, 4 pages, ForgeRock.
Ashibani, et al., "A Behavior Profiling Model for User Authentication in IoT Networks based on App Usage Patterns", IECON 2018—44th Annual Conference of the IEEE Industrial Electronics Society, Oct. 2018, pp. 2841-2846, IEEE.
Nicholson, et al., "Deceptive security based on authentication profiling", The Proceedings of 15th Australian Information Security Management Conference, Dec. 5-6, 2017, Edith Cowan University, Perth, Western Australia, pp. 140-148.

* cited by examiner

*Primary Examiner* — Andrew J Steinle
(74) *Attorney, Agent, or Firm* — Lee & Hayes, P.C.; James M. Behmke

(57) ABSTRACT

In one embodiment, an illustrative method herein may comprise: detecting, by a device, a new asset in a network with a media access control address; monitoring, by the device, the new asset to learn one or more contextual attributes of the new asset in the network; generating, by the device, a profile of the new asset based on the media access control address and the one or more contextual attributes; and using, by the device, the profile to define access and control over the new asset in the network.

19 Claims, 8 Drawing Sheets

INDUSTRIAL DEVICE MAC AUTHENTICATION BYPASS BOOTSTRAPPING

TECHNICAL FIELD

The present disclosure relates generally to computer networks, and, more particularly, to industrial device media access control (MAC) authentication bypass (MAB) bootstrapping.

BACKGROUND

The Internet of Things, or "IoT" for short, represents an evolution of computer networks that seeks to connect many everyday objects to the Internet. Notably, there has been a recent proliferation of 'smart' devices that are Internet-capable such as thermostats, lighting, televisions, cameras, and the like. In many implementations, these devices may also communicate with one another. For example, an IoT motion sensor may communicate with one or more smart lightbulbs, to actuate the lighting in a room when a person enters the room. Vehicles are another class of 'things' that are being connected via the IoT for purposes of sharing sensor data, implementing self-driving capabilities, monitoring, and the like.

The nature of the IoT makes network security particularly challenging, especially in the case of industrial settings, such as factories, mines, ports, power substations, and the like. Indeed, these types of networks are typically large scale in nature, include a variety of legacy devices that do not support authentication methods (e.g., 802.1x) and lack system patching, making it very difficult to define adequate security policies for each device.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
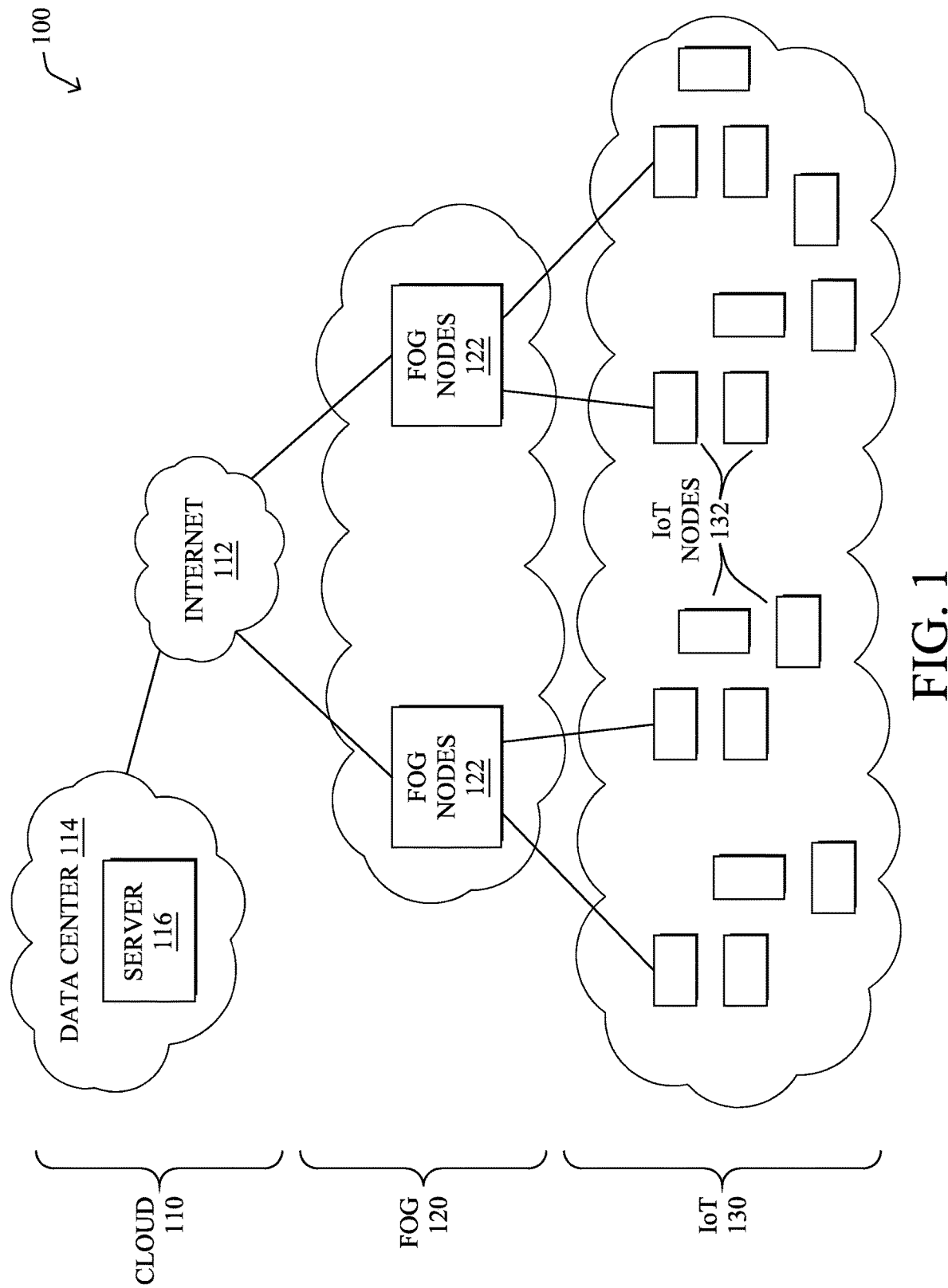
FIG. 1 illustrates an example network.

According to one or more embodiments of the disclosure, an illustrative method herein may comprise: detecting, by a device, a new asset in a network with a media access control address; monitoring, by the device, the new asset to learn one or more contextual attributes of the new asset in the network; generating, by the device, a profile of the new asset based on the media access control address and the one or more contextual attributes; and using, by the device, the profile to define access and control over the new asset in the network.

Other embodiments are described below, and this overview is not meant to limit the scope of the present disclosure.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications, and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or Powerline Communication networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer from local networks (e.g., IoT networks) to the cloud (e.g., centralized and/or shared resources, as will be understood by those skilled in the art). That is, generally, fog computing entails using devices at the network edge to provide application services, including computation, networking, and storage, to the local nodes in the network, in contrast to cloud-based approaches that rely on remote data centers/cloud environments for the services. To this end, a fog node is a functional node that is deployed close to fog endpoints to provide computing, storage, and networking resources and services. Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);
2) Links are generally low bandwidth, such that control plane traffic must generally be bounded and negligible compared to the low rate data traffic;
3) There are a number of use cases that require specifying a set of link and node metrics, some of them being dynamic, thus requiring specific smoothing functions to avoid routing instability, considerably draining bandwidth and energy;
4) Constraint-routing may be required by some applications, e.g., to establish routing paths that will avoid non-encrypted links, nodes running low on energy, etc.;
5) Scale of the networks may become very large, e.g., on the order of several thousands to millions of nodes; and
6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid advanced metering infrastructure (AMI), smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

FIG. 1 is a schematic block diagram of an example simplified computer network 100 illustratively comprising nodes/devices at various levels of the network, interconnected by various methods of communication. For instance, the links may be wired links or shared media (e.g., wireless links, powerline communication links, etc.) where certain nodes, such as, e.g., routers, sensors, computers, etc., may be in communication with other devices, e.g., based on connectivity, distance, signal strength, current operational status, location, etc.

Specifically, as shown in the example IoT network 100, three illustrative layers are shown, namely cloud layer 110, fog layer 120, and IoT device layer 130. Illustratively, the cloud layer 110 may comprise general connectivity via the Internet 112, and may contain one or more datacenters 114 with one or more centralized servers 116 or other devices, as will be appreciated by those skilled in the art. Within the fog layer 120, various fog nodes/devices 122 (e.g., with fog modules, described below) may execute various fog computing resources on network edge devices, as opposed to datacenter/cloud-based servers or on the endpoint nodes 132 themselves of the IoT layer 130. For example, fog nodes/devices 122 may include edge routers and/or other networking devices that provide connectivity between cloud layer 110 and IoT device layer 130. Data packets (e.g., traffic and/or messages sent between the devices/nodes) may be exchanged among the nodes/devices of the computer network 100 using predefined network communication protocols such as certain known wired protocols, wireless protocols, powerline communication protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Data packets (e.g., traffic and/or messages) may be exchanged among the nodes/devices of the computer network 100 using predefined network communication protocols such as certain known wired protocols, wireless protocols (e.g., IEEE Std. 802.15.4, Wi-Fi, Bluetooth®, DECT-Ultra Low Energy, LoRa, etc.), powerline communication protocols, or other shared-media protocols where appropriate. In this context, a protocol consists of a set of rules defining how the nodes interact with each other.

Figure 2:
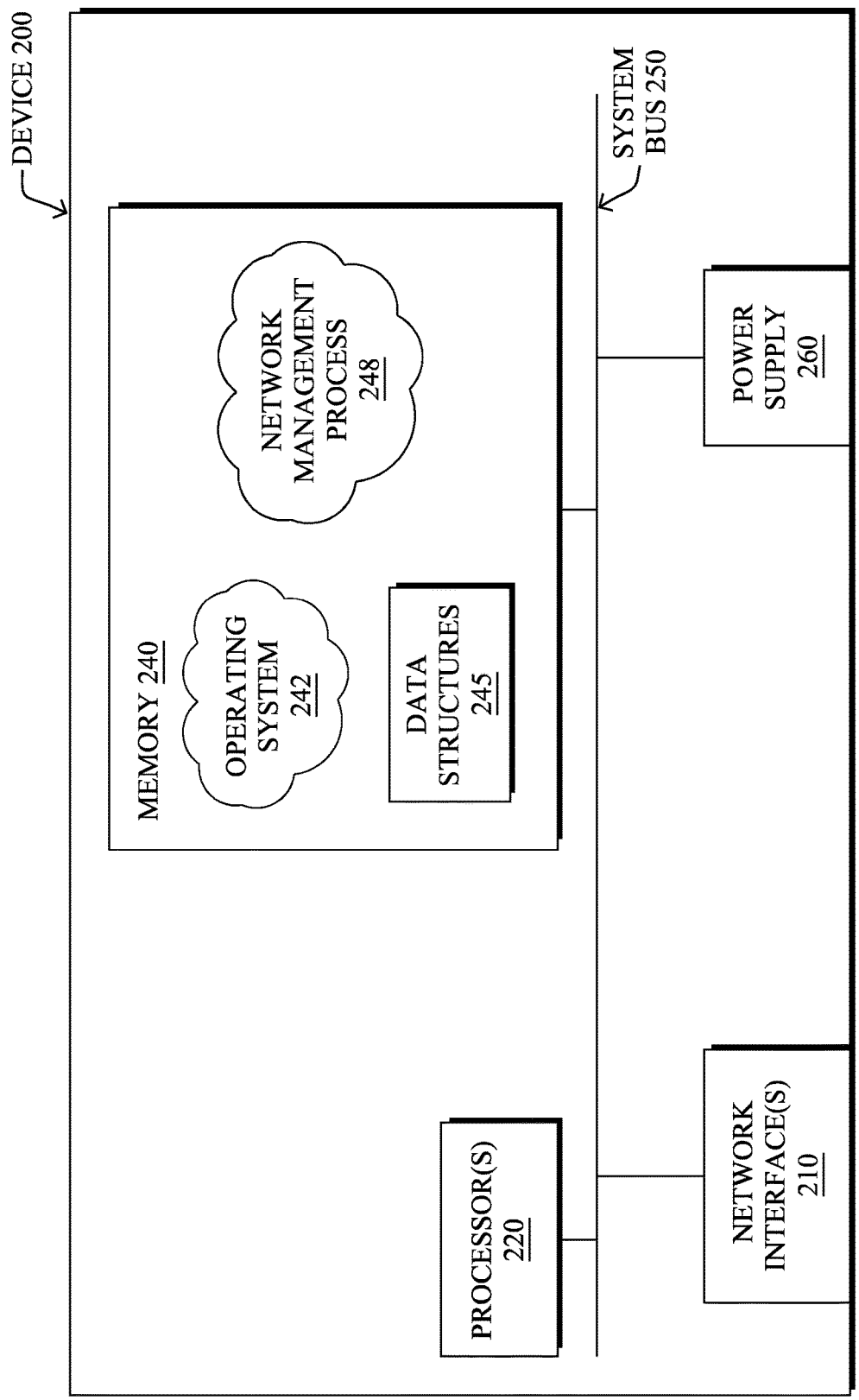
FIG. 2 illustrates an example network device/node.

FIG. 2 is a schematic block diagram of an example node/device 200 that may be used with one or more embodiments described herein, e.g., as any of the nodes or devices shown in FIG. 1 above or described in further detail below. The device 200 may comprise one or more network interfaces 210 (e.g., wired, wireless, etc.), at least one processor 220, and a memory 240 interconnected by a system bus 250, as well as a power supply 260 (e.g., battery, plug-in, etc.).

Network interface(s) 210 include the mechanical, electrical, and signaling circuitry for communicating data over links coupled to the network. The network interfaces 210 may be configured to transmit and/or receive data using a variety of different communication protocols, such as TCP/IP, UDP, etc. Note that the device 200 may have multiple different types of network connections/interfaces 210, e.g., wireless and wired/physical connections, and that the view herein is merely for illustration. Also, while the network interface 210 is shown separately from power supply 260, for powerline communications the network interface 210 may communicate through the power supply 260, or may be an integral component of the power supply. In some specific configurations the powerline communication signal may be coupled to the power line feeding into the power supply.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of CISCO Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise an illustrative "network management" process 248.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, network security (e.g., one example implementation of network management process 248 on a corresponding security device) may be configured to perform any or all of the following tasks:

1. Identifying and classifying devices in the network—this may entail, for example, determining the make, model, software configuration, type, etc. of a given device.
2. Discerning operational insights about a device—for example, network security processes may assess the traffic of a particular device, to determine what the device is doing, or attempting to do, via the network. Such information may take the form of device details and communication maps for the device. In further cases, the device functions and application flows may be converted into tags and/or events for presentation to a user interface. Further, network security processes may also track variable changes, to monitor the integrity of the industrial workflow.
3. Detecting anomalies—network security processes may also assess the behaviors of a device on the network, to determine whether its behaviors are anomalous. In various embodiments, this may entail network security processes determining whether the behavior of the device has changed significantly over time and/or does not fit the expected behavioral pattern for its classification. For example, if the device is identifies as being a temperature sensor that periodically sends temperature measurements to a supervisory service, but the device is instead communicating data elsewhere, network security processes may deem this behavior anomalous.

In various embodiments, network security processes herein may employ any number of machine learning (ML) and/or artificial intelligence (AI) techniques, to assess the gathered telemetry data regarding the traffic of the device. In general, machine learning is concerned with the design and the development of techniques that receive empirical data as input (e.g., telemetry data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a,b,c such that the number of misclassified points is minimal. After this optimization/learning phase, network security processes can use the model M to classify new data points, such as information regarding new traffic flows in the network. Often, M is a statistical model, and the cost function is inversely proportional to the likelihood of M, given the input data.

In various embodiments, network security processes may employ one or more supervised, unsupervised, or semi-supervised machine learning models. Generally, supervised learning entails the use of a training set of data, as noted above, that is used to train the model to apply labels to the input data. For example, the training data may include sample telemetry data that is "normal," or "suspicious." On the other end of the spectrum are unsupervised techniques that do not require a training set of labels. Notably, while a supervised learning model may look for previously seen attack patterns that have been labeled as such, an unsupervised model may instead look to whether there are sudden changes in the behavior of the network traffic. Semi-supervised learning models take a middle ground approach that uses a greatly reduced set of labeled training data.

Example machine learning techniques that network security processes can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of traffic flows that are incorrectly classified as malware-generated, anomalous, etc. Conversely, the false negatives of the model may refer to the number of traffic flows that the model incorrectly classifies as normal, when actually malware-generated, anomalous, etc. True negatives and positives may refer to the number of traffic flows that the model correctly classifies as normal or malware-generated, etc., respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

In some cases, network security processes may assess the captured telemetry data on a per-flow basis. In other embodiments, network security processes may assess telemetry data for a plurality of traffic flows based on any number of different conditions. For example, traffic flows may be grouped based on their sources, destinations, temporal characteristics (e.g., flows that occur around the same time, etc.), combinations thereof, or based on any other set of flow characteristics.

Notably, certain aspects of the techniques herein may be based on approaches to tag assets/devices in a network based on their telemetry data. In some aspects, this tagging can be used to drive network policy enforcement regarding the assets.

Figure 3:
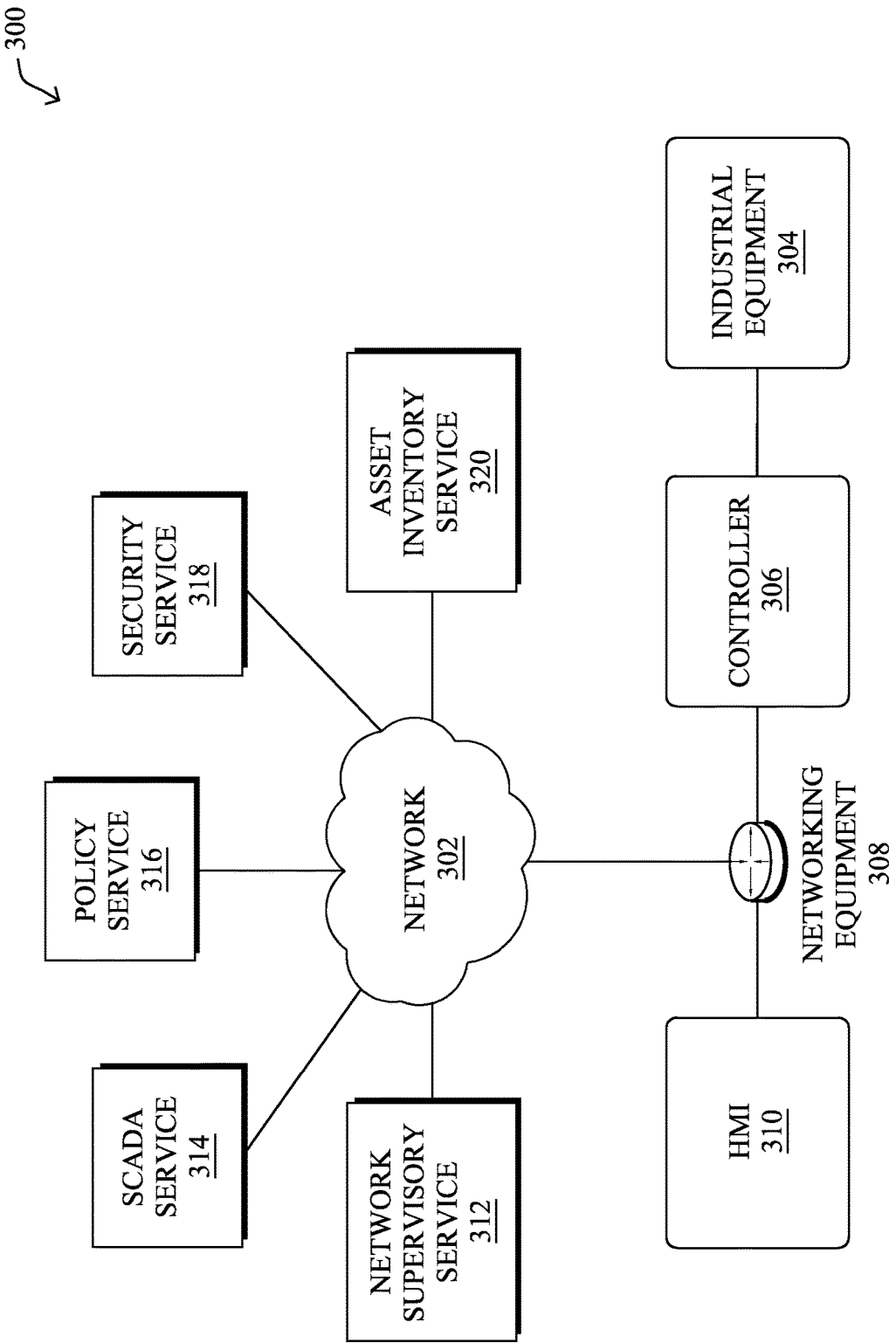
FIG. 3 illustrates an example network architecture for an industrial network.

For example, FIG. 3 illustrates an example network architecture 300 for an industrial network, according to various embodiments. As shown, architecture 300 may include industrial equipment 304 connected to a controller 306, such as a programmable logic controllers (PLC), a variable frequency drive (VFD), or the like, that controls the operations of industrial equipment 304. In turn, controller 306 for industrial equipment 304 may be connected to a human-machine interface (HMI) 310 via networking equipment 308, allowing a human user to interface with it (e.g., to visualize the industrial process, issue commands, etc.). In addition, networking equipment 308 may also provide connectivity via the greater network 302 to any number of network services 312-320 provided in the local network of networking equipment 308 and/or remotely. For example, services 312-320 may be implemented in the local network via dedicated equipment or virtualized across any number of devices (e.g., networking equipment 308). In other cases, services 312-320 may be provided by servers in a remote data center, the cloud, or the like.

As would be appreciated, industrial equipment 304 may differ, depending on the industrial setting in which architecture 300 is implemented. In many cases, industrial equipment 304 may comprise an actuator such as, but not limited to, a motor, a pump, a solenoid, or the like. In other cases, industrial equipment 304 may include a circuit and controller 306 may control the powering of the circuit.

Industrial equipment 304 may also include any number of sensors configured to take measurements regarding the physical process implemented by industrial equipment 304. For example, such sensors may take temperature readings, distance measurements, humidity readings, voltage or amperage measurements, or the like, and provide them to controller 306 for industrial equipment 304. During operation, controller 306 may use the sensor data from industrial equipment 304 as part of a control loop, thereby allowing controller 306 to adjust the industrial process as needed.

HMI 310 may include a dedicated touch screen display or may take the form of a workstation, portable tablet or other handheld, or the like. Thus, during operation, visualization data may be provided to HMI 310 regarding the industrial process performed by industrial equipment 304. For example, such visualizations may include a graphical representation of the industrial process (e.g., the filling of a tank, etc.), the sensor data from industrial equipment 304, the control parameter values used by controller 306, or the like. In some embodiments, HMI 310 may also allow for the reconfiguration of controller 306, such as by adjusting its control parameters for industrial equipment 304 (e.g., to shut down the industrial process, etc.).

Networking equipment 308 may include any number of switches, routers, firewalls, telemetry exporters and/or collectors, gateways, bridges, and the like. In some embodiments, these networking functions may be performed in a virtualized/containerized manner. For example, a telemetry exporter may take the form of a containerized application installed to networking equipment 308, to collect and export telemetry regarding the operation networking equipment 308 (e.g., queue state information, memory or processor resource utilization, etc.) and/or network 302 (e.g., measured delays, drops, jitter, etc.).

In some embodiments, at least a portion of network 302 may be implemented as a software-defined network (SDN). In such implementations, control plane decisions by the networking equipment of network 302, such as networking equipment 308, may be centralized with an SDN controller. For example, rather than networking equipment 308 establishing routing paths and making other control decisions, individually, such decisions can be centralized with an SDN controller (e.g., network supervisory service 312, etc.).

During operation, network supervisory service 312 may function to monitor the status and health of network 302 and networking equipment 308. An example of such a network supervisory service is DNA-Center by CISCO Systems, Inc. For example, in some implementations, network supervisory service 312 may take the form of a network assurance service that assesses the health of network 302 and networking equipment 308 through the use of heuristics, rules, and/or machine learning models. In some cases, this monitoring can also be predictive in nature, allowing network supervisory service 312 to predict failures and other network conditions before they actually occur. In either case, network supervisory service 312 may also provide control over network 302, such as by reconfiguring networking equipment 308, adjusting routing in network 302, and the like. As noted above, network supervisory service 312 may also function as an SDN controller for networking equipment 308, in some embodiments.

As shown, architecture 300 may also include supervisory control and data acquisition (SCADA) service 314 which supervises the operation of the industrial process. More specifically, SCADA service 314 may communicate with controller 306, to receive data regarding the industrial process (e.g., sensor data from industrial equipment 304, etc.) and provide control over controller 306, such as by pushing new control routines, software updates, and the like, to controller 306.

As would be appreciated, SCADA service 314, controller 306, and/or HMI 310 may communicate using an automation protocol. Examples of such protocols may include, but are not limited to, Profibus, Modbus, DeviceNet, HART, DNP3, IEC 61850, IEC 60870-5, and the like. In addition, different protocols may be used within network 102 and among networking equipment 308, depending on the specific implementation of architecture 300. Further, different portions of network 302 may be organized into different cells or other segmented areas that are distinct from one another and interlinked via networking equipment 308.

Architecture 300 may also include a policy service 316 that is responsible for creating and managing security and access policies for endpoints in network 302. An example of such a policy service 316 is the Identity Services Engine (ISE) by CISCO Systems, Inc. In various embodiments, as detailed below, policy service 316 may also be configured to identify the types of endpoints present in network 302 (e.g., HMI 310, controller 306, etc.) and their corresponding actions/functions. In turn, this information can be used to drive the policies that policy service 316 creates.

Security service 318 is configured to enforce the various policies created and curated by policy service 316 in the network. For example, such policies may be implemented by security service 318 as access control lists (ACLs), firewall rules, or the like, that are distributed to networking equipment 308 for enforcement.

According to various embodiments, architecture 300 may also include asset inventory service 320 that is used to collect information about learned assets/endpoints in network 302 and maintain an inventory of these various devices in network 302. In various embodiments, asset inventory service 320 may do so by embedding sensing modules in networking equipment 308 which passively analyze communications between endpoints. The sensors may use deep packet inspection (DPI) to not only identify the protocols in use by a given packet (e.g., the automation protocol used between HMI 310, controller 306, and SCADA service 314), but also understand the action(s) that are being communicated and to classify both the type of device/component and its application behavior.

For example, when a sensor module executed by networking equipment 308 identifies the use of an automation protocol by a packet, it may examine the payload of each flow to identify any or all of the following:
- The device type (e.g., based on passive scan of traffic and matching a known criterion, the device is classified).
- The software and/or hardware versions of the device.
- MAC and IP addresses of all devices with which the discovered device is communicating.
- The activity profile of the device (e.g., how is it trying to communicate), and the protocol(s) it is using.
- The commands that are being passed (e.g., SCADA commands, etc.), down to the specific control parameter values.

The sensor modules of networking equipment 308 then then organize the collected information into meaningful tags. In general, these tags are simply a way to categorize devices and their behaviors, similar to the same way a human may look at a pen or a pencil and categorize them as writing instruments. Each device can also have multiple tags associated with it, such as the following:
- Component Tags—these tags identify device specific details (e.g., Device ID, SCADA station, PLC, WINDOWS device, etc.).
- Activity Tags—these tags identify what the device is doing at the protocol level (Programming CPU, Heartbeat, Emergency Break, Data Push).
- User-Defined Tags—these could be custom tags to supply additional context (e.g. "Cell 1 Tag").
- Dynamically Generated Tags—these could be added dynamically (e.g., using ML) to signify whether the behavior of the device is normal or anomalous, or for other dynamic conditions.
- Scalable Group Tags—These tags are applied to specific packet flows between a defined group of devices/services in the network. For example, in the case shown, HMI 310, controller 306, and SCADA service 314 may be tagged as belonging to a particular group.

The sensor modules embedded in networking equipment 308 may also collect metadata about the communicating devices/endpoints, including its network identifiers (e.g., IP and MAC addresses), vendor, device-type, firmware version, the switch ID and port where the device is connected, etc. As the sensor module learns details of a new device/endpoint in network 302, it may send its collected metadata about that device, along with its tags, to the asset inventory service 320.

In this manner, asset inventory service 320 may maintain an inventory of each of the endpoint devices in network 302, their associated tags, and their metadata. Thus, as new devices are discovered in network 302, their profile information is added to the live inventory of devices maintained by asset inventory service 320. As noted above, the various tags applied by the sensor modules deployed to networking equipment 308 and used by asset inventory service 320 may be predefined or may, via a user interface (not show) be user-defined.

Figure 4A:
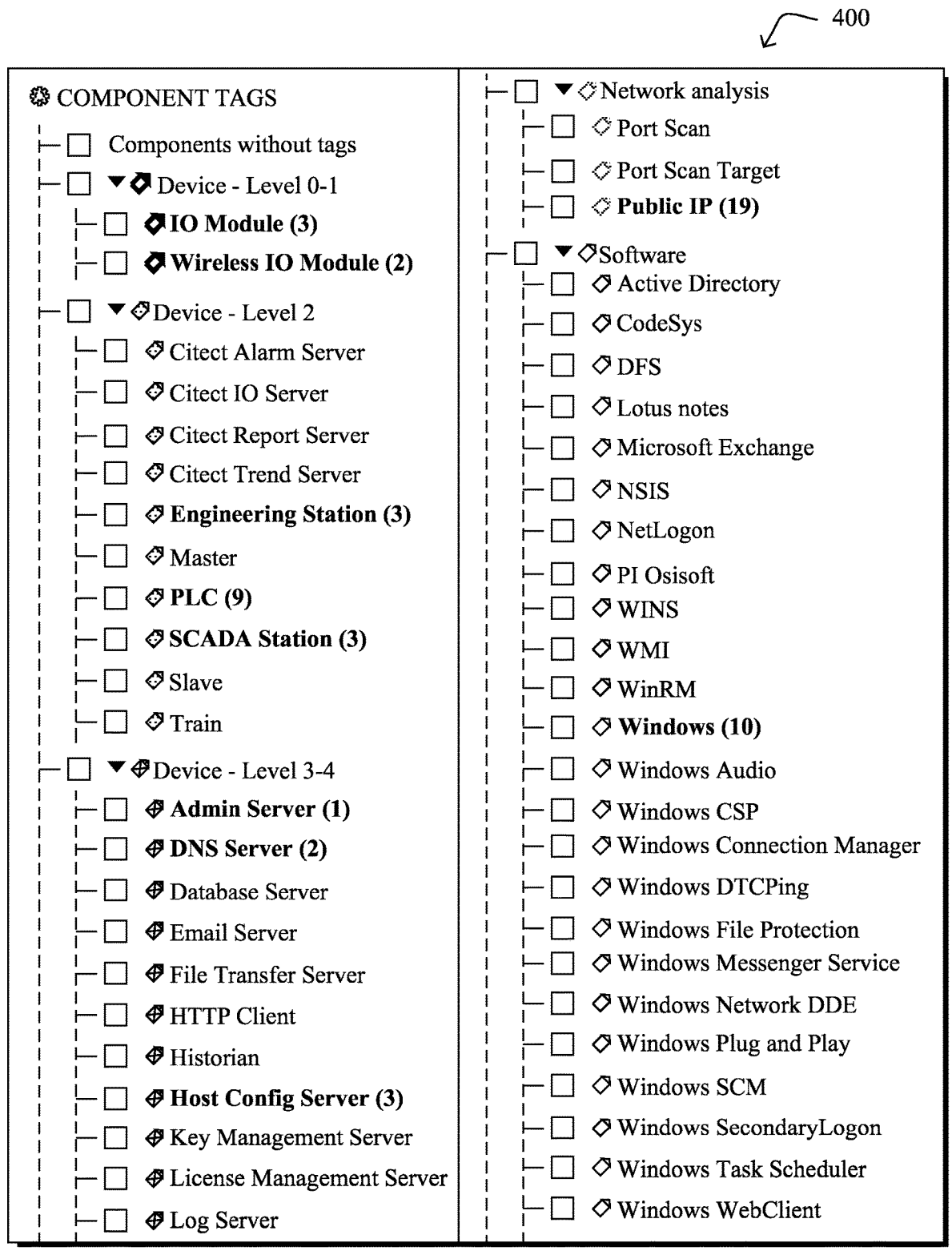
FIGS. 4A-4B illustrate example displays of component and activity tags.
Figure 4B:
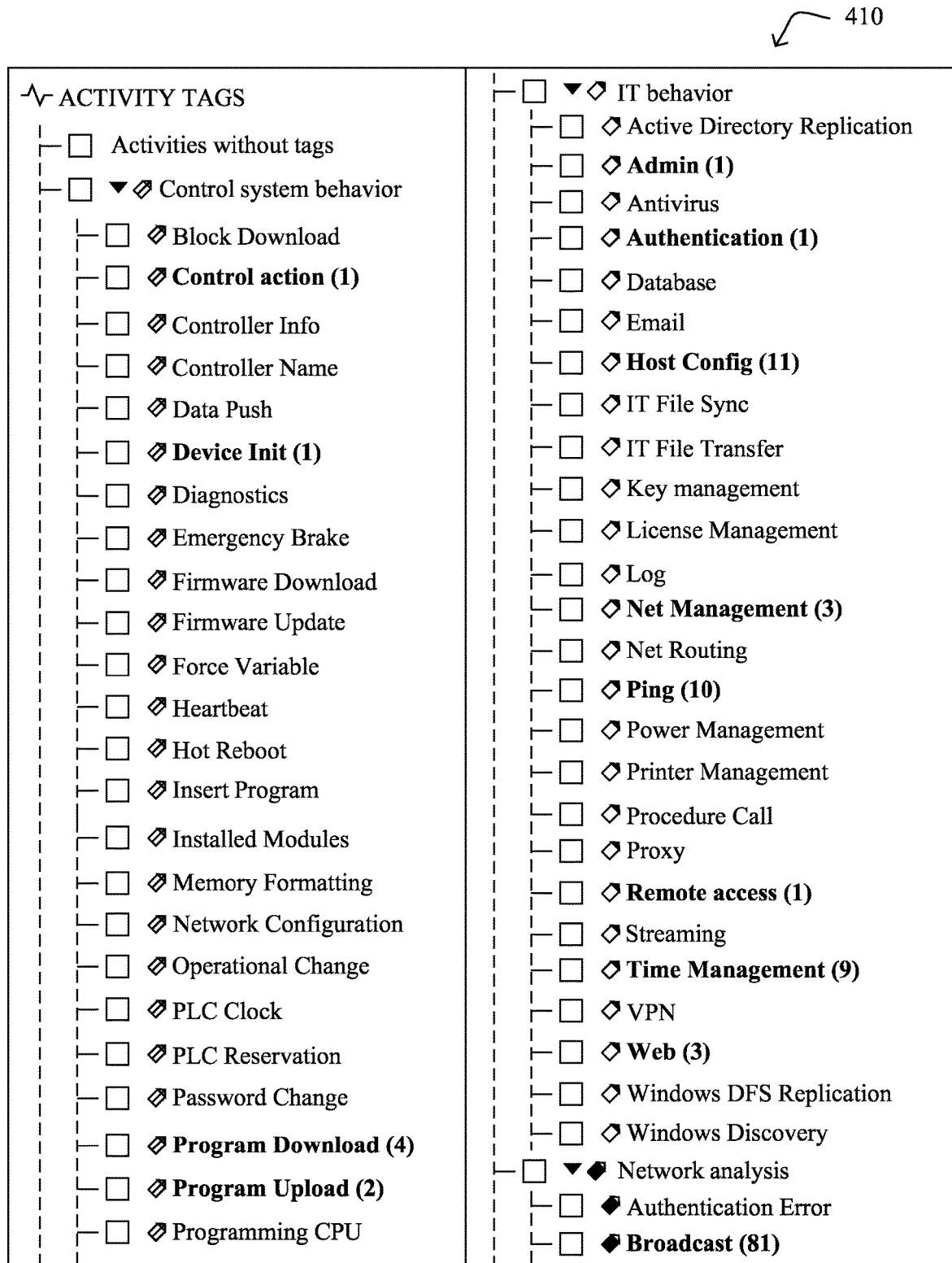

FIGS. 4A-4B illustrate example displays 400, 410, respectively, showing component and activity tags, in some embodiments. As shown, the various component tags can be used to identify a particular endpoint or other device in the network by its type (e.g., PLC, SCADA station, etc.), its software (e.g., CodeSys, WINDOWS, etc.). In addition, analysis of the traffic of the device can also lead to various activity tags being applied to that device, as well. For example, such activity tags may distinguish between control system behaviors (e.g., insert program, device init., etc.) and IT behaviors (e.g., host config., ping, etc.).

Referring again to FIG. 3, to facilitate the labeling of devices in network 302 using tags, asset inventory service 320 may also leverage device classification functions provided by policy service 316, to identify the component and activity tags of a particular device in network 302 under scrutiny. In general, device classification (also known as "device profiling") has traditionally used static rules and heuristics for the determination. In further embodiments, the device classification by policy service 316 can be achieved by applying a trained machine learning-based classifier to the captured telemetry data from networking equipment 308. Such telemetry data can also take the form of information captured through active and/or passive probing of the device. Notably, this probing may entail policy service 316 sending any or all of the following probes via networking equipment 308:
- Dynamic Host Configuration Protocol (DHCP) probes with helper addresses
- SPAN probes, to get messages in INIT-REBOOT and SELECTING states, use of ARP cache for IP/MAC binding, etc.
- Netflow probes
- HyperText Transfer Protocol (HTTP) probes to obtain information such as the operating system (OS) of the device, Web browser information, etc.
- Remote Authentication Dial-In User Service (RADIUS) probes.
- Simple Network Management Protocol (SNMP) to retrieve Management Information Base (MIB) object or receives traps.
- Domain Name System (DNS) probes to get the Fully Qualified Domain Name (FQDN)
- etc.

Further information that may be captured by networking equipment 308 and reported via telemetry data to policy service 316 may include traffic behavioral characteristics of the traffic of a device, such as the communication protocols used, flow information, timing and pattern data, and the like.

In addition, the telemetry data may be indicative of the operational intent of the endpoint device (e.g., controller 306, HMI 310, etc.).

According to various embodiments, additional information that policy service 316 and asset inventory service 320 may use to tag the various devices/components in network 302 may include any or all of the following:

- Manufacturer's Usage Description (MUD) information—As proposed in the Internet Engineering Task Force (IETF) draft entitled, "Manufacturer Usage Description Specification," devices may be configured by their manufacturers to advertise their device specifications. Such information may also indicate the intended communication patterns of the devices.
- Asset Administration Shell data—this is an Industry 4.0 method to express how an IoT device should behave, including expected communication patterns.
- IEC 61850 Substation Configuration Language (SCL) data—this is a language that is used primarily in the utility industry to express Intelligent Electronic Device (IED) intent.
- Open Platform Communication Unified Architecture (OPC UA) data—such data provides industrial models used in manufacturing contexts.

Thus, policy service 316, asset inventory service 320, and the sensor modules and telemetry exporters of networking equipment 308 may operate in conjunction with one another to apply various tags to the devices in network 302 and their traffic flows.

Figure 5:
FIG. 5 illustrates an example display of an asset profile.

FIG. 5 illustrates an example display 500 of an asset profile, in some embodiments. As can be seen, a particular asset has been identified as a Yokogawa device and has been tagged with various component and activity tags (e.g., PLC, CodeSys, Citect Report, etc.). This profile may be stored by the asset inventory service (e.g., service 320 in FIG. 3) and provide to a user interface, allowing the user to quickly learn information about the device. Such information can also be automatically updated over time, using the techniques herein.

Referring again to FIG. 3, the various tags can also be used to augment flow telemetry, such as Netflow records, IPFIX records, or the like. To do so, asset inventory service 320 may propagate any of its stored tags to a Netflow collector or other telemetry exporter. As would be appreciated, such telemetry exporters typically build flow tables based on Netflow-9 metadata, such as 5-Tuple TCP/IP information, etc. However, such telemetry collectors and analyzers do not understand what the device is or how it should be operating. According to various embodiments, augmenting a telemetry exporter to understand the OT policy and intent of industrial devices allows for better enforcement of the allowed flows in an OT environment, and improves troubleshooting when a cyber incident occurs.

In various embodiments, by tagging the endpoint devices in network architecture 300 in terms of what they are and what they should do, it becomes possible to automatically implement and enforce network policies and to quickly identify security threats. To do so, policy service 316 can be used to authenticate, authorize, and provide policies for specific endpoints and/or user in network 302. Generic elements of such a policy may specify component, activity, or other tags. For example, a generic policy may be created for all PLCs in Cell Area Zone 1. Such a policy may specify a 'PLC' component tag, as well as activity tags indicative of what types of activities the PLCs are allowed to perform, what protocols they are allowed to communicate, and with whom they are allowed to communicate. For instance, controller 306 may be allowed to communicate with other industrial devices in the same Cell Area Zone, but not beyond. In another instance, controller 306 may only be allowed to communicate with an HMI in the same zone, such as HMI 310.

Typically, a policy generated by policy service 316 will take the form of a logical combination of tags. For example, one policy may be as follows:

IF the device is a PLC AND is in CELL-1 THEN it may talk to device-x

When this policy is deployed to networking equipment 308, controller 306 may be allowed to communicate with H-MI 310, but may be restricted from communicating with other devices via network 302. Notably, this can even lead to policies that are cell/zone specific in the OT network 302 (e.g., a PLC is restricted from communicating with other devices outside of its cell).

During operation, policy service 316 may receive updates from asset inventory service 320, either periodically or on demand. This allows policy service 316 visibility into all of the discovered devices on the network, along with their tags and other metadata. Preferably, policy service 316 will use the same tag format as that of asset inventory service 320. In turn, policy service 316 may create an entry for the device based on what has been discovered, with specific data updated based on information learned by the sensor in networking equipment 308 (e.g., the telemetry collector/exporter) and given through asset inventory service 320.

By pushing a policy to networking equipment 308, the corresponding networking equipment 308 can enforce the policy by applying it to any traffic flow in network 302. If the traffic flow is then deemed non-compliant, the networking equipment 308 can initiate a corrective measure, such as blocking the flow from reaching its destination, raising an alarm, redirecting the flow, or the like.

Note that, in some cases, it may not be possible for policy service 316 to perform an exact match between a discovered device and an existing policy, through the use of tags alone. In such a situation, policy service 316 may leverage a machine learning classifier (e.g., a neural network or the like) to perform such a matching, using the tags and other metadata information about the device (e.g., its observed communication patterns, etc.). Note also that the deployed sensor(s) in networking equipment 308 can also update the tags for a particular device over time, as well. If this occurs, policy service 316 may re-evaluate the policy assigned to that device.

In some implementations, enforcement of the identified policy can be achieved by passing the policy to security service 318. This can be achieved via application programming interface (API) export or, as noted above, by embedding the assigned tags directly into the telemetry exports that are ingested, parsed, and processed by the security processes of networking equipment 308. In addition, the analyzer can group flows by their expected context, for purposes of visualizations. For instance, such a visualization could show all OT devices that are slaves of a particular SCADA master.

By comparing the flow details that have enhanced with the tag information to the deployed policy, the security mechanism can identify policy violations. For example, OT devices use very prescribed flows, such as SCADA service 314 being restricted to communicating with SCADA endpoints/slaves using a SCADA protocol. If a non-SCADA master is shown to be communicating with a SCADA device, even if the protocol and commands were valid, this would be considered a security violation by the enforcing networking equipment 308 and corrective measures initiated.

Said differently, when a new flow is generated, the telemetry collector/exporter may cross reference the IP address(es) of the new flow entry with the type or definition of the asset, to enhance the flow telemetry. In turn, the analyzer of such telemetry can then assess the tags and security policy assigned to the devices, to enforce the policy.

In further embodiments, the policy enforcement can also rely on behavioral analytics, to identify any behavioral anomalies exhibited by an endpoint device. By tracking and updating the activity tags of a device over time using the above techniques, this effectively creates a baseline behavioral profile for that device. Thus, when its behavior suddenly deviates from its expected activities/behaviors, the analyzing networking equipment 308 can initiate a corrective measure. If a new activity tag is associated with the device, this can be compared with its associated policies, to determine whether this new behavior is still acceptable.

Since activity tags can be learned and updated over time, when a new device appears or disappears on network 302, it may also be assigned a temporal tag to indicate that the device should be scrutinized. For example, if a device tagged as critical disappears from the network, a critical alarm could be raised. Similarly, when a new device suddenly appears on the network, it may be assigned a "new" tag and its behavior monitored to a higher degree and/or have more stringent policies applied to it.

For example, HMI 310 may be allowed to load a new program to controller 306, but if a "new" PLC in network 302 similarly attempts to load a program to controller 306, then an alarm may be triggered.

In one embodiment, the networking equipment 308 enforcing a policy may leverage a Naïve Bayes classifier or other suitable machine learning-based classifier, to determine whether the new device on the network presents a threat. The temporal tags can also be aged out over time, as the device's behavior is deemed normal over a defined period of time and is, thus, trustworthy.

In other words, when either a new endpoint device appears on network 302 or an existing endpoint device begins to operate in a new way (e.g., new tags are added or appear in its traffic flows), the networking equipment 308 enforcing the policies may compute and assess the probability that the endpoint device (and/or its behavior) is either benign or malicious. Data parameters, primarily the component and activity tags, as well as flow characteristics are used as input parameters for this computation. In some embodiments, these data points could also be clustered in an n-dimensional space, to profile both benign and malicious behavior from past events and devices. In turn, a Naïve Bayes classifier could create cluster boundaries for these clusters and classify the endpoint device under scrutiny as either benign or malicious, accordingly.

—Industrial Device MAB Bootstrapping—

As noted above, the nature of the IoT makes network security particularly challenging. For example, endpoint identity is the foundation of a zero trust architecture and secure networks in general, however most Industrial IoT (IIoT) endpoints do not support 802.1x (an authentication framework that allows a user to be authenticated by a central authority). When solutions such as an Identity Services Engine (ISE) available from CISCO Systems, Inc. are used for Network Access Control and micro-segmentation, this presents a problem. The typical work-around relies on using MAC Authentication Bypass (MAB) (a MAC-address-based authentication mechanism) instead of 802.1x. However, provisioning of the endpoints and their associated MAC addresses is a labor intensive manual process and is error prone. To help alleviate some of these concerns, authentication may be based on Active Directory Domain Controller and using the associated device MAC addresses to admit devices to the network. In an Industrial IoT setting however, most of the endpoints do not support Active Directory authentication and hence this method also does not help.

Additionally, MAC addresses can also be spoofed. Simply authenticating a device based on a MAC address assumes that the device is actually the proper device, and not another device with a false or copied MAC address.

The techniques herein, therefore, provide for industrial device MAB bootstrapping through a method to onboard IoT industrial devices using MAB (devices that do not support 802.1x), leveraging a combination of its MAC address and an inventory of behavioral analytics engine tags, as detailed above, obtained by active and/or passive profiling. Identity services (e.g., ISE) may then be updated with this information after the device is discovered and on-boarded, after which it may be automatically authorized on the network.

Specifically, according to one or more embodiments of the disclosure as described in detail below, an illustrative method herein may comprise: detecting, by a device, a new asset in a network with a media access control address; monitoring, by the device, the new asset to learn one or more contextual attributes of the new asset in the network; generating, by the device, a profile of the new asset based on the media access control address and the one or more contextual attributes; and using, by the device, the profile to define access and control over the new asset in the network.

Illustratively, the techniques described herein may be performed by hardware, software, and/or firmware, such as in accordance with the network management process 248, which may include computer executable instructions executed by the processor 220 to perform functions relating to the techniques described herein, e.g., particularly as part of an operations manager, and/or other devices in combination or in conjunction, as described below.

Operationally, the techniques herein avoid administrative overhead associated with manual provisioning of MAC addresses by relying on automated device discovery, automated device profiling, and OT user validation.

Figure 6:
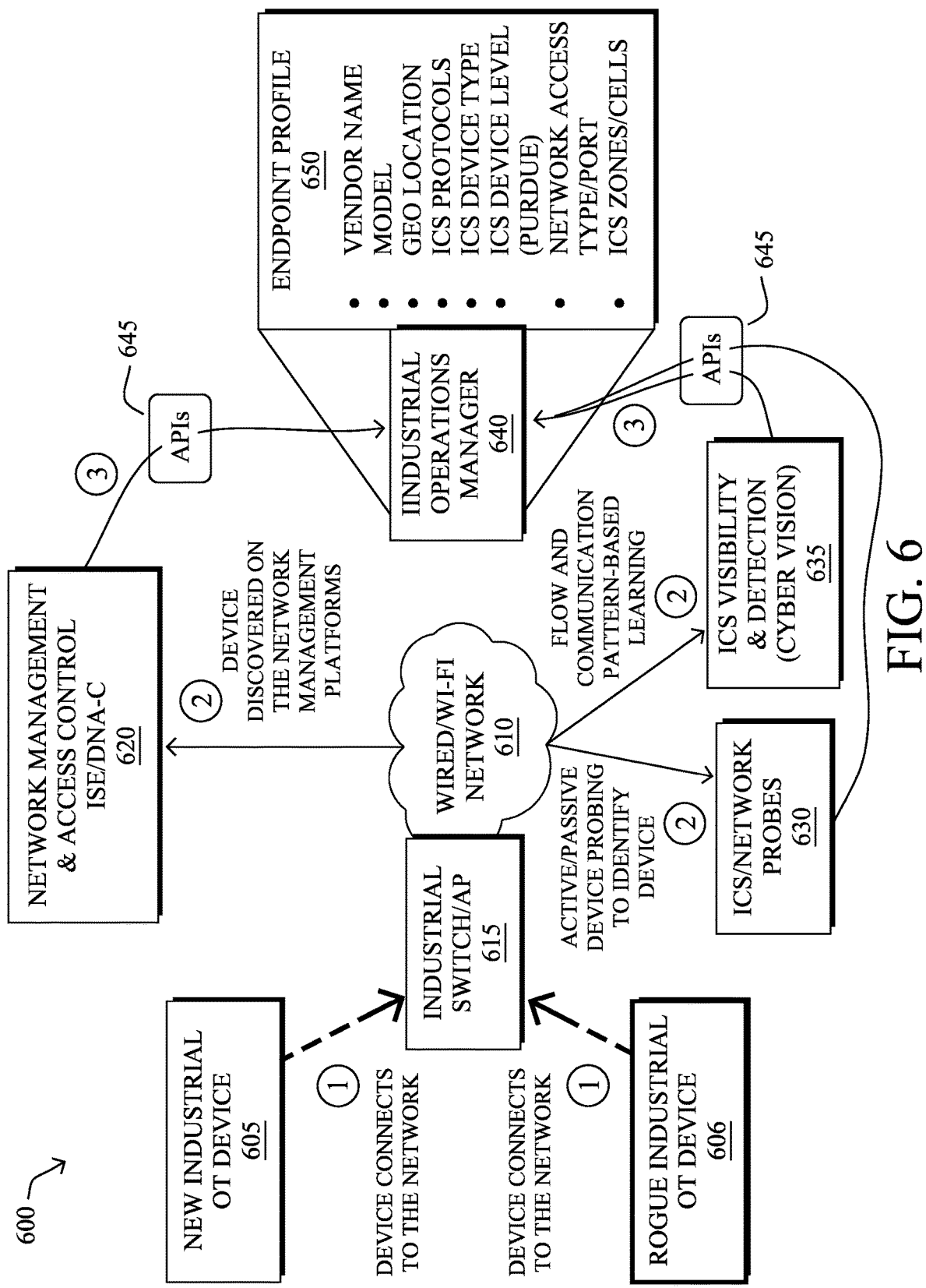
FIG. 6 illustrates examples environment for industrial device media access control (MAC) authentication bypass (MAB) bootstrapping.

With reference generally to environment 600 of FIG. 6, when a new device 605 (or rogue device 606) is plugged into the network 610, the device is "unknown" by the network management and access control module 620 (e.g., ISE/DNA-C) and as a result, MAB fails and it is only given limited access to the network. The techniques herein, therefore, rely on automatically profiling the new device in order to provide the OT admin (console, dashboard, automated control, etc.) more detailed information about the new device. Based on device profile information, the decision can be made as to whether to accept this new device and automatically have its MAC address added to a list of approved devices.

More specifically, the techniques herein rely on either the access switch (or access point, etc.), switch/AP 615, having device profiling capabilities or it can steer traffic (or SPAN it) to a device that has such capabilities (e.g., industrial operations manager 640). The profiling can be done by passively inspecting traffic from the device (e.g., visibility and detection module 635, such as CISCO Cyber Vision), which is likely limited given its restricted access, as well as active probing of the device (e.g., network probes 630).

While typical device profiling is well-known technology, in the techniques herein, profiling relies on obtaining the following contextual attributes:

OT Contextual Information (e.g., cell/area zone);
Network level information (e.g., as per IEC 62443);
OT contextual information (e.g., provided by leveraging a tool such as Cyber Vision available from CISCO Systems, Inc., which is a deep-packet inspection (DPI) technology for industrial network protocols that decodes instructions sent and received by IoT devices (via industrial protocols) to analyze their behavior, optionally expressing the learned details as "component tags" and corresponding behavior as "activity tags", accordingly.

Notably, the types of device information that is of particular interest herein includes (but is not limited to):

Device Vendor name, e.g. "Rockwell";
Device Name, "Siemens 85:3:f9";
Device Type, e.g. "Controller";
Device Model, e.g. "IM155";
Device Serial Number;
Device Operating System;
Device Hardware and Firmware version;
Component Tags in general, which identify the type of device, such as IO Module, Engineering Station, Historian, etc.;
Activity Tags in general, which provide various information about the device communication, such as Protocols (e.g., Profinet), Control System Behavior, etc.

Note that not all of the above information may necessarily be obtainable when the device connects to the network initially. The information available depends on the traffic generated as well as whether active probing is possible for the device in question.

Network level information is information that can be gleaned from the network infrastructure itself. The types of information that is of particular interest herein includes (but is not limited to):

Access switch (some devices should only be in some parts of the network);
Access port (specific instructions may be given as to which port a given device should be plugged into);
Geo-location (approximate) of the device or alternatively the access switch, etc. (some devices should only be in certain locations);
DHCP information (in particular option 60—vendor class identifier);
Other network level information of interest includes Netflow data, which enables further profiling of the device.

Once the new device is detected and profiled (e.g., sending information to industrial operations manager 640 via APIs 645 to create endpoint profile 650), the profile is visible to the OT user in a management station or other controller. The OT admin (user and/or console) can then chose to either accept or reject the device. If accepted, the device's MAC address is added to ISE, such that the next time the device appears, it will complete MAB successfully and immediately joins the network.

Periodically, a policy server (ISE) may poll the profiling server (e.g., a behavioral analytics engine, such as Cyber Vision) to ensure that nothing has changed in the device profile, such as the Component/Asset or Activity tags, network telemetry data, etc. If changes begin to appear, the device may again be presented to an administrative authority to admit the device. If accepted, the MAC address will again be able to be used to automatically authenticate the device.

Another embodiment herein is a situation where the new OT device is plugged into a "special" onboarding switch first. That switch may then learn the MAC address of the new device and the MAC address will be added to a list of "pending" devices to onboard. The flow here thus includes an implied/assumed user authentication step (so not everybody can just plug in a device and get it approved).

In still another embodiment, the new asset is a replacement of an existing device. For example, in an IIoT setting, avoiding production downtime is very important, and hence it should be possible to replace a device in the middle of the night when OT support personnel may not be present. This can be done relatively securely by relying on the device profiling capabilities of the access switch (or access point, etc.). For instance, if "device A" is replaced by "device B", the techniques herein can allow this if, for example, device B is connected to the same switch port (or switch) as device A was, and the device profile is the same. The access may be time-limited (e.g., 12 hours) and may require approval by the OT admin in order to subsequently complete successful onboarding.

As shown in FIG. 6, therefore, the following labeled steps may take place in an illustrative example of the techniques herein:

1. A device 605/606 is plugged into the access network 610 using an available ethernet port or WiFi (switch/AP 615).
2. The techniques herein begin auto-profiling of the new device to learn the following attributes:
   Network association characteristics such as access type, location, authentication type/status;
   Industrial Control System insights learned from the OT Visibility Platforms such as CISCO Cyber Vision;
   ICS/SCADA smart scanning and passive monitoring of known OT ports/protocols.
3. Based on the learnings from Step 2, an endpoint profile 650 is autogenerated for the OT admin console/controller.

Accordingly, this profile can be used by the OT admin to securely and seamlessly bootstrap a valid device to the OT network. Also, the autogenerated profile can be used by the OT policy engine to assign the device the right network access and control.

Figure 7:
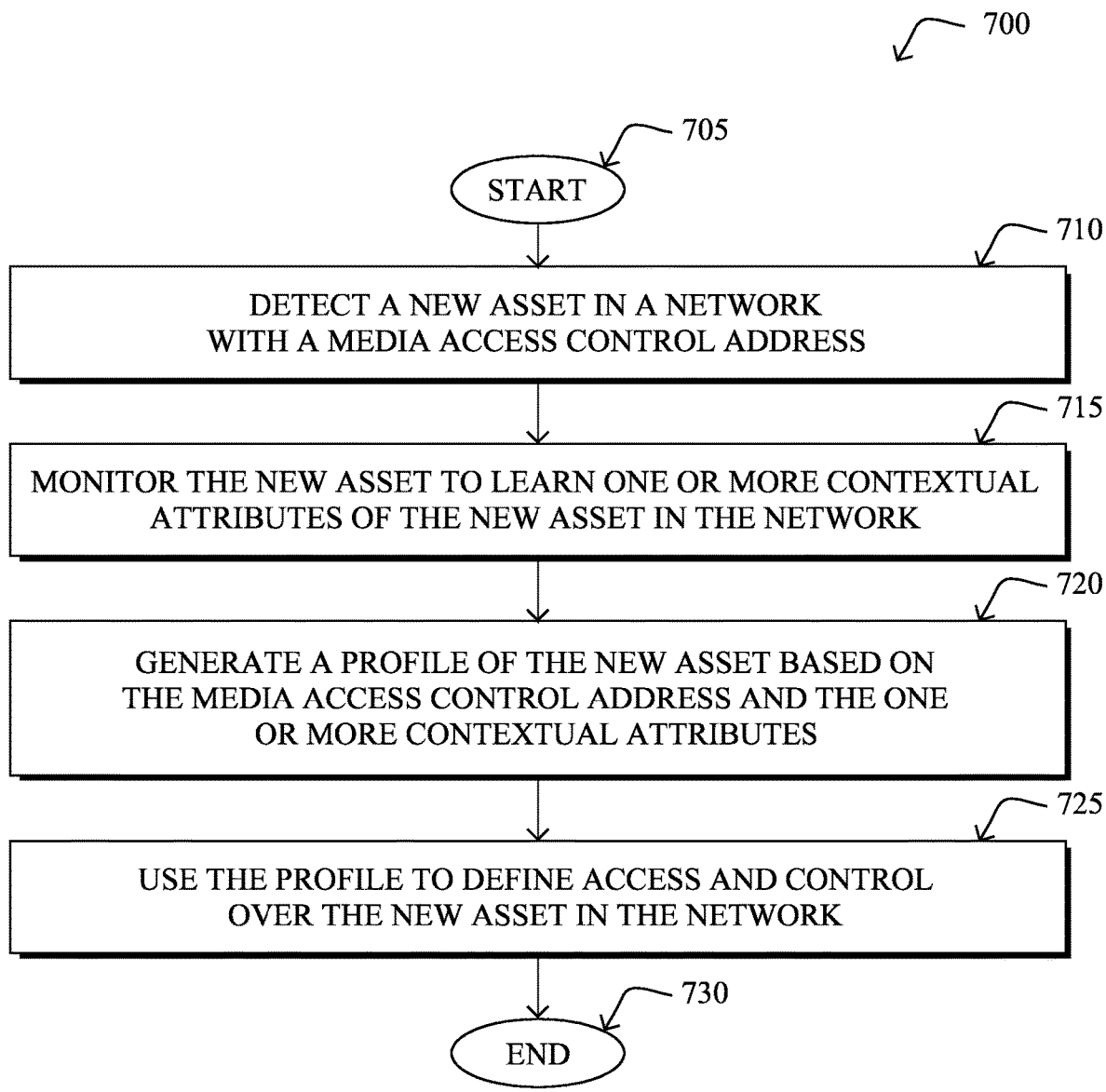
FIG. 7 illustrates an example simplified procedure for industrial device MAB bootstrapping.

In closing, FIG. 7 illustrates an example simplified procedure 700 for industrial device media access control (MAC) authentication bypass (MAB) bootstrapping in accordance with one or more embodiments described herein. For example, a non-generic, specifically configured device (e.g., device 200, such as an industrial switch/AP 615, industrial operations manager 640, etc.) may perform procedure 700 by executing stored instructions (e.g., process 248). The procedure 700 may start at step 705, and continues to step 710, where, as described in greater detail above, the device detects a new asset (e.g., device 605/605) in a network with a MAC address. In step 715, the device monitors the new asset to learn one or more contextual attributes of the new asset in the network, as detailed above. For instance, while in one embodiment the device performing procedure 700 is an access switch or an access point in the network (e.g., switch/AP 615), in an alternative embodiment the device is instead a profiling device (e.g., industrial operations manager 640), and monitoring in step 715 comprises receiving traffic from the new asset forwarded via one of either an access switch or an access point in the network.

In step 720, the device generates a profile of the new asset based on the MAC address and the one or more contextual attributes. For example, as described above, the contextual attributes may be based on network association characteristics of the new asset (e.g., access type, location, authentication type/status, etc.), control system behavioral analytics insights of the new asset, and/or one or more ports and/or one or more protocols used by the new asset (e.g., determined by one or both of active probing or passive scanning).

Note also that as described above, in one embodiment herein detecting the new asset may be on a specific switch in the network, in which case one of the contextual attributes could be an indication (e.g., assumption) of validity based on the new asset being detected on the specific switch. Alternatively, in another embodiment herein, detecting the new asset may be as a replacement to an old asset in the network, in which case one of the contextual attributes could be an indication (e.g., assumption) of validity (e.g., for a certain period of time) based on the new asset being a replacement to the old asset.

In step 725, the device can then use the profile to define access and control over the new asset in the network. For instance, as detailed above, the device may share the profile with an administrative controller (e.g., OT admin, automated process, etc.) to accept or reject the new asset in the network. In addition, the device may also share the profile with a policy engine in the network to assign an appropriate network access and control for the new asset. Note, too, that the device may deny, or cause to deny, access to the network for the new asset when the profile is invalid.

The simplified procedure 700 may then end in step 730, notably with the option to continue detecting new assets, or updating profiles based on updated behaviors, accordingly. For instance, other steps may also be included generally within procedure 700. For example, such steps (or, more generally, such additions to steps already specifically illustrated above), may include: detecting a change in behavior of the new asset in the network; generating a new profile of the new asset based on the change in behavior; and using the new profile to redefine access and control over the new asset in the network; and so on.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for industrial device MAB bootstrapping, particularly for industrial/IoT environments, though any network with simple devices that are not smart, do not have a strong identity. In particular, the techniques herein allow a new asset/device to enter a network using its MAC address, and then then use behavior (profiles) to authenticate the device for network access control (e.g., determining whether the new asset should be able to access the network at all). In this manner, since MACs are easy to spoof, the techniques herein allow for confidence in trusting that the device is the actual device it purports to be based on the device acting like it is the device it purports to be, allowing for securely onboarding the device into the network, accordingly.

According to the embodiments herein, an illustrative method herein may comprise: detecting, by a device, a new asset in a network with a media access control address; monitoring, by the device, the new asset to learn one or more contextual attributes of the new asset in the network; generating, by the device, a profile of the new asset based on the media access control address and the one or more contextual attributes; and using, by the device, the profile to define access and control over the new asset in the network.

In one embodiment, using the profile to define access and control over the new asset in the network comprises: sharing the profile with an administrative controller to accept or reject the new asset in the network.

In one embodiment, using the profile to define access and control over the new asset in the network comprises: sharing the profile with a policy engine in the network to assign an appropriate network access and control for the new asset.

In one embodiment, using the profile to define access and control over the new asset in the network comprises: denying access to the network for the new asset when the profile is invalid.

In one embodiment, the method further comprises: detecting a change in behavior of the new asset in the network; generating a new profile of the new asset based on the change in behavior; and using the new profile to redefine access and control over the new asset in the network.

In one embodiment, the method further comprises: detecting the new asset on a specific switch in the network, wherein one of the one or more contextual attributes is an indication of validity based on the new asset being detected on the specific switch.

In one embodiment, the method further comprises: detecting the new asset as a replacement to an old asset in the network, wherein one of the one or more contextual attributes is an indication of validity based on the new asset being a replacement to the old asset.

In one embodiment, one or more of the one or more contextual attributes are based on one or more network association characteristics of the new asset. In one embodiment, the one or more network association characteristics of the new asset are selected from a group consisting of: an access type of the new asset; a location of the new asset; an authentication type of the new asset; and an authentication status of the new asset.

In one embodiment, one or more of the one or more contextual attributes are based on control system behavioral analytics insights of the new asset.

In one embodiment, one or more of the one or more contextual attributes are based on one or more ports and/or one or more protocols used by the new asset. In one embodiment, the method further comprises: determining the one or more ports and/or one or more protocols used by the new asset by one or both of active probing of the new asset or passive scanning of the new asset.

In one embodiment, the device comprises one of either an access switch or an access point in the network.

In one embodiment, the device comprises a profiling device, and the method further comprises: receiving traffic from the new asset forwarded via one of either an access switch or an access point in the network.

According to the embodiments herein, an illustrative tangible, non-transitory, computer-readable medium herein may have computer-executable instructions stored thereon that, when executed by a processor on a computer, may cause the computer to perform a method comprising: detecting a new asset in a network with a media access control address; monitoring the new asset to learn one or more contextual attributes of the new asset in the network; generating a profile of the new asset based on the media access control address and the one or more contextual attributes; and using the profile to define access and control over the new asset in the network.

Further, according to the embodiments herein an illustrative apparatus herein may comprise: a processor configured to execute one or more processes; and a memory configured to store a process that is executable by the processor, the process, when executed, configured to: detect a new asset in a network with a media access control address; monitor the new asset to learn one or more contextual attributes of the new asset in the network; generate a profile of the new asset based on the media access control address and the one or more contextual attributes; and use the profile to define access and control over the new asset in the network.

While there have been shown and described illustrative embodiments herein, it is to be understood that various other adaptations and modifications may be made within the intent and scope of the embodiments herein. For example, while specific endpoint device types are described, the techniques can be applied to any number of different types of devices. Further, while the techniques herein are described as being performed at certain locations within a network, the techniques herein could also be performed at other locations, as desired (e.g., fully in the cloud, fully within the local network, etc.). Also, while certain protocols and/or network environments have been shown, these are merely examples of specific implementations of the techniques herein, and the embodiments herein are not so limited.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method, comprising:
   detecting, by a device, a new asset in a network with a media access control address, wherein the new asset does not support authentication by a central authority;
   monitoring, by the device, the new asset to learn one or more contextual attributes of the new asset in the network, wherein at least one of the one or more contextual attributes is based on control system behavioral analytics insights of the new asset and comprises a component or activity tag;
   generating, by the device, a profile of the new asset based on the media access control address and the one or more contextual attributes; and
   using, by the device, the profile to define access and control over the new asset in the network.

2. The method as in claim 1, wherein using the profile to define access and control over the new asset in the network comprises:
   sharing the profile with an administrative controller to accept or reject the new asset in the network.

3. The method as in claim 1, wherein using the profile to define access and control over the new asset in the network comprises:
   sharing the profile with a policy engine in the network to assign an appropriate network access and control for the new asset.

4. The method as in claim 1, wherein using the profile to define access and control over the new asset in the network comprises:
   denying access to the network for the new asset when the profile is invalid.

5. The method as in claim 1, further comprising:
   detecting a change in behavior of the new asset in the network;
   generating a new profile of the new asset based on the change in behavior; and
   using the new profile to redefine access and control over the new asset in the network.

6. The method as in claim 1, further comprising:
   detecting the new asset on a specific switch in the network, wherein one of the one or more contextual attributes is an indication of validity based on the new asset being detected on the specific switch.

7. The method as in claim 1, further comprising:
   detecting the new asset as a replacement to an old asset in the network, wherein one of the one or more contextual attributes is an indication of validity based on the new asset being a replacement to the old asset.

8. The method as in claim 1, wherein one or more of the one or more contextual attributes are based on one or more network association characteristics of the new asset.

9. The method as in claim 8, wherein the one or more network association characteristics of the new asset are selected from a group consisting of: an access type of the new asset; a location of the new asset; an authentication type of the new asset; and an authentication status of the new asset.

10. The method as in claim 1, wherein one or more of the one or more contextual attributes are based on one or more ports and/or one or more protocols used by the new asset.

11. The method as in claim 10, further comprising:
    determining the one or more ports and/or one or more protocols used by the new asset by one or both of active probing of the new asset or passive scanning of the new asset.

12. The method as in claim 1, wherein the device comprises one of either an access switch or an access point in the network.

13. The method as in claim 1, wherein the device comprises a profiling device, the method further comprising:
    receiving traffic from the new asset forwarded via one of either an access switch or an access point in the network.

14. A tangible, non-transitory, computer-readable medium having computer-executable instructions stored thereon that, when executed by a processor on a computer, cause the computer to perform a method comprising:
    detecting a new asset in a network with a media access control address, wherein the new asset does not support authentication by a central authority;
    monitoring the new asset to learn one or more contextual attributes of the new asset in the network, wherein at least one of the one or more contextual attributes is based on control system behavioral analytics insights of the new asset and comprises a component or activity tag;
    generating a profile of the new asset based on the media access control address and the one or more contextual attributes; and
    using the profile to define access and control over the new asset in the network.

15. The tangible, non-transitory, computer-readable medium as in claim 14, wherein using the profile to define access and control over the new asset in the network comprises:

sharing the profile with an administrative controller to accept or reject the new asset in the network.

16. The tangible, non-transitory, computer-readable medium as in claim 14, wherein using the profile to define access and control over the new asset in the network comprises:

sharing the profile with a policy engine in the network to assign an appropriate network access and control for the new asset.

17. The tangible, non-transitory, computer-readable medium as in claim 14, wherein using the profile to define access and control over the new asset in the network comprises:

denying access to the network for the new asset when the profile is invalid.

18. The tangible, non-transitory, computer-readable medium as in claim 14, wherein the method further comprises:

detecting a change in behavior of the new asset in the network;

generating a new profile of the new asset based on the change in behavior; and using the new profile to redefine access and control over the new asset in the network.

19. An apparatus, comprising:

a processor configured to execute one or more processes; and a memory configured to store a process that is executable by the processor, the process, when executed, configured to:

detect a new asset in a network with a media access control address, wherein the new asset does not support authentication by a central authority;

monitor the new asset to learn one or more contextual attributes of the new asset in the network, wherein at least one of the one or more contextual attributes is based on control system behavioral analytics insights of the new asset and comprises a component or activity tag;

generate a profile of the new asset based on the media access control address and the one or more contextual attributes; and use the profile to define access and control over the new asset in the network.

\* \* \* \* \*